Figure 1:
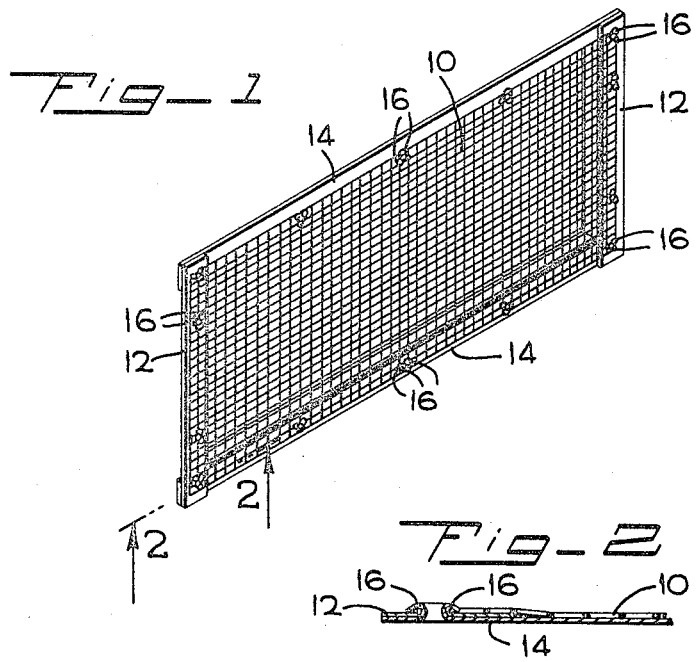

INVENTORS
ROY W. FREDERICKSON
HAROLD R. WILSON
BY
Paul B. Fike
PATENT AGENT

# United States Patent Office 3,332,473
Patented July 25, 1967

3,332,473
SCREEN VENT STRUCTURE
Roy W. Frederickson, 1078 Las Palmas Drive, Santa Clara, Calif. 95051, and Harold R. Wilson, 1887 Sumatra Drive, San Jose, Calif. 95122
Filed May 8, 1964, Ser. No. 366,091
1 Claim. (Cl. 160—371)

The present invention relates generally to screens and more particularly to screen vent structures.

In the construction of residences or industrial buildings, it is requisite that attic spaces above the structure and foundation spaces below the subflooring be vented to the atmosphere. However, it is also desirable that the vent openings be screened to prevent the entrance of rodents, bugs and the like, and, for this purpose, screen vent structures have been utilized. At the present time, such screen vent structures conventionally include a generally rectangular section of wire mesh that is secured at its peripheral edges by spot welding to a sheet metal frame which is, in turn, attached to the portions of the structure surrounding the vent opening. Whereas spot welding has been found to be rather effective in securing one piece of sheet metal to another, such spot welding operation does not always achieve a secure connection between the wire mesh of the screen and the adjoining metallic frame. Quite commonly, the thin metallic strands which form the screen are completely melted during the spot welding operation and no connection whatsoever is effected. If such difficulty be avoided and the screen strands are bonded to the adjoining metal frame, the strength of the bond made to one point of the wire mesh is not too great so that accidental separation of the screen from its mounted frame frequently occurs.

Accordingly it is the general object of the present invention to provide a novel and improved screen vent structure or similar unit which incorporates an improved arrangement for securing a screen section to its mounting frame and additionally to the method for fabricating such structure.

More particularly, it is a feature of the present invention to provide a screen vent structure which includes a screen and a mounting frame therefor in the form of sheet material which is severed, displaced, and rebent into clamping engagement with the screen to effect the desired secure attachment therebetween.

Additionally, it is a feature of the invention to provide a screen vent structure wherein the frame structure is composed of a plurality of strips of sheet metal which are secured to one another simultaneously with the securing of the screen thereto.

An additional feature of the invention is the provision of a screen vent structure including a sheet metal frame attached to the wire mesh screen by displacement of a portion of the sheet metal so as to provide openings in the frame which are substantially no larger than the screen interstices yet are sufficiently large to permit the passage of a nail therethrough to facilitate the securing of the structure over the vent opening of a residence or the like.

Figure 4:
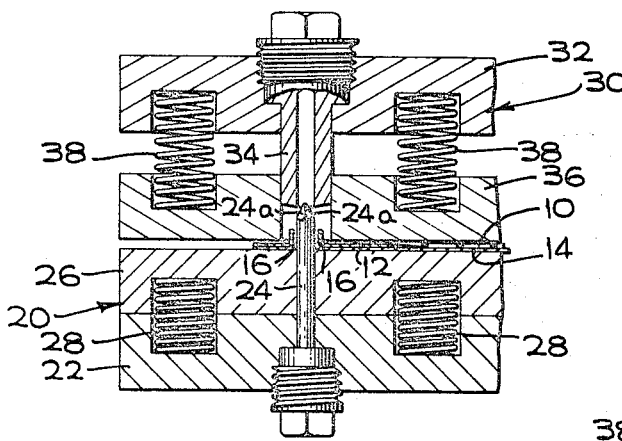
Figure 5:
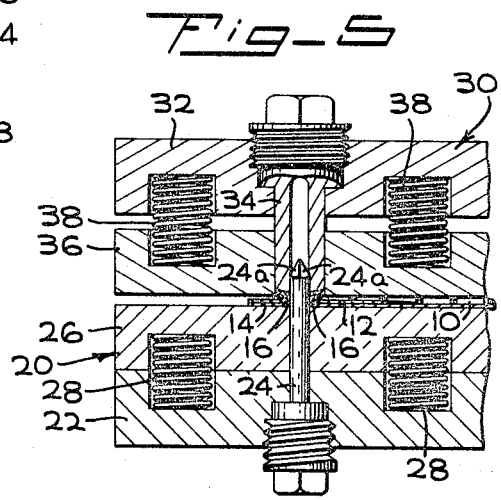
Figure 3:
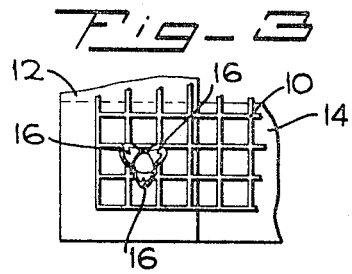

These and other objects and features of the invention become more apparent from a perusal of the following description of the structure illustrated in the accompanying drawing wherein:

FIG. 1 is a perspective view of a screen vent structure embodying the present invention, FIG. 2 is an enlarged fragmentary sectional view taken along line 2—2 of FIG. 1, FIG. 3 is a fragmentary top plan view as viewed from the top of FIG. 2, FIG. 4 is a fragmentary sectional view illustrating one step of the method of formation of the screen vent structure shown in FIGS. 1, 2 and 3 by operation of a single stage die, and FIG. 5 is a view similar to FIG. 4 illustrating completion of another step of the method.

With initial reference to FIG. 1, the exemplary screen vent structure includes a generally rectangular section of wire mesh screen 10 which is secured adjacent its peripheral edges to a frame formed from end sections 12 and side sections 14, all of which are composed of elongated strips of sheet material.

Commonly, one-quarter-inch wire mesh is utilized for the screen 10 and the metallic strips 12, 14 are then approximately one half inch width, the overall dimensions of both screen and frame members being of course determined by the size of the vent opening to which the screen structure is to be applied.

The screen 10 is secured to the frame by displacing a generally circular section of the sheet material through the screen, and then rebending the same into clamping engagement therewith, as most clearly illustrated in FIG. 2. The generally described action at the corners of the structure where the frame sections overlap displaces corresponding portions of both strip sheets so that the frame sections 12, 14 are secured to one another at such overlapping juncture at the same time that the screen 10 is secured thereto. Preferably as can best be visualized by reference to FIG. 3, the sheet metal is not only centrally severed but is also partially or fully severed along radial lines at arcuate intervals of 120 degrees so that three resultant securing tabs, as indicated at 16 in FIG. 3, are formed.

To assure firm attachment, the circular displaced section of the sheet material has a diameter substantially equivalent to the size of the wire mesh, for example, one-quarter inch. The size of the openings in the sheet material are accordingly no larger than the interstices of the wire mesh so that its screening function is not destroyed. At the same time, the amount of material so displaced is sufficient for rebending into contact with the screen wires regardless of whether the opening formed in the sheet material registers with one opening in the wire mesh or is aligned with one of the wires itself.

As shown in FIG. 1, a plurality of clamped connections are formed between the wire screen 10 and the encompassing frame sections 12, 14 and the resultant holes can be utilized in certain installations for the passage of securing nails therethrough.

Generally, the method of securing the sheet material to the wire mesh screen includes the initial step of holding the sheet material against one surface of the screen, then severing the sheet material and displacing a portion thereof beyond the opposite surface of the screen, whence the final step of rebending the displaced portion of the sheet material into clamping engagement with the opposite surface of the screen can complete the securing operation.

Quite obviously, if the precise screen structure shown in FIG. 1 is to be formed, all of the clamping connections can be formed simultaneously and the steps of the method as generally described immediately above will serve not only to secure the screen 10 to the frame sections 12, 14 at intervals along the screen periphery but will simultaneously serve to clamp the corners of the frame elements to one another.

The method adapts itself to a single-stage die operation which can be described more readily by additional reference to FIGS. 4 and 5. As shown in such figures the lower die member 20 includes a rigid base 22 in the form of a plate to which is rigidly but removably secured an elongated punch 24 that extends upwardly through an opening in a pressure plate 26 that is normally urged upwardly from the rigid base 22 by a plurality of coil springs 28.

The upper end of the punch 24 is generally of conical configuration but preferably as illustrated includes three flats 24a, each of which has an arcuate extent of approximately 120 degrees wherefore three tapered edges are provided.

The upper die member 30, which is arranged for movement downwardly towards the lower die member 20 thereof, includes a base plate 32 rigidly secured to a movable mount (not shown) and supporting an annular punch 34 whose central opening corresponds in diameter to that of the punch 24 on the base 22 of the lower die member 20 for slidable reception thereof and whose exterior is slidable through an opening in a pressure plate 36 that is urged downwardly from the upper base plate 32 through the use of coil springs 38 whose strength is greater than that of the coil springs 28 resiliently separating the sections 22, 26 of the lower die member 20. The annular punch 24 also has a generally conical end configuration, the cone being of rather shallow depth.

In operation, while the die members 20, 30 are still separated, the frame sections 12, 14 are assembled on the lower die member and the screen 10 is laid thereover in appropriate position which can be determined by suitable jigging arrangements (not shown). Downward motion of the upper die member 30 is then instigated which first serves to bring the two pressure plates 26, 36 into resilient clamping engagement with the screen and frame sections, as illustrated in FIG. 4. Thereafter, continued downward movement of the upper die member 30 forces the pressure plate 26 of the lower die member 20 downwardly thereby permitting the rigidly supported punch 24 to engage the under surface of the sheet metal to sever the same and then pass upwardly therethrough to effect an upward displacement of the sheet material. At the corners of the structure, two sections of sheet, as shown in FIG. 4 are displaced through and beyond the upper surface of the resiliently held screen. Because of the flats 24a on the end of the punch 24 the displaced metal is radially severed into three separate tabs 16. When the pressure plate 26 of the lower die member 20 engages the rigid base 22, the punch 24 has reached its upward limit and has completed the displacement of the metal so as to attain the disposition illustrated in FIG. 4.

Continued downward movement of the upper die member 30 overcomes the resilient force of the coil springs 38 to thereby allow the annular punch 34 to move downwardly over the pointed punch 24 into engagement with the upwardly displaced sheet metal tabs 16 to effect a rebending thereof from the disposition shown in FIG. 4 to the final configuration clearly illustrated in FIG. 5 thus completing the clamped connection. It is to be particularly observed that even though the sheet metal is displaced first in one direction and then rebent in another direction, both actions are achieved by moving the elements of a die in the same direction.

Not only is a secure clamped connection provided avoiding the possibility of wires being melted as in a spot welding operation, but the screen 10 and the distinct frame sections 12, 14 are all secured to one another in a single operation consisting of a plurality of steps which can be accomplished by a one-stage die.

Obviously, many modifications and alterations can be envisioned without departing from the spirit of the present invention and the foregoing description of one structure and its method of fabrication is to be considered merely as exemplary and not in a limiting sense. The actual scope of the invention is to be indicated only by reference to the appended claims.

What is claimed is:

A vent structure which comprises a screen composed of wire mesh having substantially square interstices of predetermined dimensions, a frame composed of sheet metal engaging one surface of said screen adjacent its peripheral edges, and means for securing said frame to said screen at spaced points, said securing means including at each point a circular section of the sheet displaced through said screen and rebent outwardly into clamping engagement with the circularly-adjacent portions of the wire mesh, said displaced circular section of the sheet having a diameter substantially equal to the dimensions of said interstices in said screen.

References Cited
UNITED STATES PATENTS

| | | | |
|---|---|---|---|
| 430,000 | 6/1890 | Clark et al. | 29—509 |
| 637,083 | 11/1899 | Case | 160—404 X |
| 934,570 | 9/1909 | Ranney | 160—371 |
| 1,379,001 | 5/1921 | Diven | 160—404 X |
| 1,487,335 | 3/1924 | Jaeger | 160—381 |
| 1,719,236 | 7/1929 | Ritter | 160—371 |
| 1,790,504 | 1/1931 | Jackson | 160—371 X |
| 2,020,408 | 11/1935 | Fruth | 113—116 |
| 2,333,966 | 11/1943 | Weiss | 113—116 |
| 2,404,197 | 7/1946 | Sirp | 113—116 |
| 2,568,139 | 9/1951 | Behnke | 160—404 |
| 3,197,860 | 7/1963 | Gracer | 29—509 |

HARRISON R. MOSELEY, *Primary Examiner.*

P. C. KANNAN, *Assistant Examiner.*